United States Patent
Weidner et al.

(10) Patent No.: US 9,645,346 B2
(45) Date of Patent: May 9, 2017

(54) SELF-ALIGNING DOUBLET LENS ASSEMBLY

(71) Applicant: Fluke Corporation, Everett, WA (US)

(72) Inventors: William Weidner, Dublin, NH (US); Timothy Olsen, Milford, NH (US); William F. Jackson, Jr., Keene, NH (US)

(73) Assignee: Fluke Corporation, Everett, WA (US)

( * ) Notice: Subject to any disclaimer, the term of this patent is extended or adjusted under 35 U.S.C. 154(b) by 102 days.

(21) Appl. No.: 14/538,604

(22) Filed: Nov. 11, 2014

(65) Prior Publication Data
US 2016/0131865 A1    May 12, 2016

(51) Int. Cl.
| | | |
|---|---|---|
| *G02B 7/02* | (2006.01) | |
| *G02B 3/00* | (2006.01) | |
| *G02B 9/04* | (2006.01) | |
| *G02B 13/00* | (2006.01) | |

(52) U.S. Cl.
CPC .............. *G02B 7/021* (2013.01); *G02B 3/00* (2013.01); *G02B 7/022* (2013.01); *G02B 7/025* (2013.01); *G02B 9/04* (2013.01); *G02B 13/008* (2013.01)

(58) Field of Classification Search
CPC ........ G02B 7/021; G02B 7/022; G02B 7/025; G02B 3/00
USPC .................................................. 359/793–795
See application file for complete search history.

(56) References Cited

U.S. PATENT DOCUMENTS

| | | | |
|---|---|---|---|
| 2005/0207034 A1* | 9/2005 | Kimura .................. | G02B 7/022 359/819 |
| 2006/0198037 A1 | 9/2006 | Kulakofsky et al. | |
| 2011/0026144 A1* | 2/2011 | Shyu ....................... | B29C 43/18 359/819 |
| 2013/0120823 A1* | 5/2013 | Pei ........................... | G02F 1/153 359/275 |
| 2013/0265660 A1 | 10/2013 | Yoshida et al. | |
| 2014/0029114 A1 | 1/2014 | Kim | |
| 2016/0033740 A1* | 2/2016 | Bone ................... | G02B 13/0015 359/793 |

FOREIGN PATENT DOCUMENTS

JP         638884    *  3/1988    ............... G02B 7/02

OTHER PUBLICATIONS

Extended European Search Report for Application No. EP15194100.2, Date of Mailing: Mar. 15, 2016, 6 pages.

* cited by examiner

*Primary Examiner* — Jordan Schwartz
*Assistant Examiner* — George G King
(74) *Attorney, Agent, or Firm* — Fredrikson & Byron, P.A.

(57) ABSTRACT

Doublet lenses and doublet lens assemblies, and methods of assembling doublet lenses and assemblies, including a first lens having a convex surface and a concave surface, the concave surface comprising a peripheral portion and a central portion, and a second lens having a convex surface and a concave surface, the concave surface comprising a peripheral portion and a central portion. The peripheral portion of the first lens abuts the peripheral portion of the second lens with an airspace between the central portion of the first lens and the central portion of the second lens. The peripheral portions of the first and second lenses are shaped to fit together in a mating relationship which prevents sliding of the first and second lenses relative to each other in a radial direction after the lenses are brought together.

13 Claims, 8 Drawing Sheets

SELF-ALIGNING DOUBLET LENS ASSEMBLY

BACKGROUND

Doublet lenses may be used for various purposes when it is desirable to combine two simplex lenses. The lenses may be abutting and may be of the same or different materials. Some types of doublet lenses include an air space between the lenses and are referred to as air spaced doublets.

The use of doublet lenses requires precise alignment of the lenses, to assure that the centering of the optical axis, the tilt of the lenses, and the space between the lenses is correct within allowed tolerances. Furthermore, tight tolerances are normally required to assure that the lenses produce high quality images.

Various methods are known for aligning the lenses of the doublet lens and for securing the lenses in alignment. However, each of these methods is time consuming and expensive because of the high degree of precision and the fine adjustments of position that are required. For example, the doublet lens may be created by aligning the lenses mechanically or optically. To align them, the first lens may be mounted on a fixture on a spindle, such as a rotating air bearing spindle. A mechanical indicator may be used to detect when the outside diameter and the face of the lens run true. Alternatively, a focusing autocollimator may be focused on the center of the optical surface, which is usually a spherical surface, so that the runout of the optical surface can be observed in the eyepiece of the autocollimator. The lens can be set on the spindle using a combination of these methods. The second lens can then be set on its mounting surface, which is usually in contact with the first lens. The position of the second lens is then set to be running true using a combination of the centering methods described above. After it is set in the correct position, it is fixed in position using glue to hold the lenses together or to a common lens cell. In some cases, the lenses are glued together at the optical surface, such as if they are for visible light. The process is challenging and misalignment can occur, despite following the time consuming process.

SUMMARY

Various embodiments include doublet lenses and doublet lens assemblies and methods of manufacturing doublet lenses and doublet lens assemblies. In some embodiments, the doublet lens includes a first lens having a convex surface and a concave surface, the concave surface comprising a peripheral portion and a central portion, and a second lens having a convex surface and a concave surface, the concave surface comprising a peripheral portion and a central portion. The peripheral portion of the first lens abuts the peripheral portion of the second lens and there is an airspace between the central portion of the first lens and the central portion of the second lens. The peripheral portions of the first and second lenses are shaped to fit together in a mating relationship which prevents sliding of the first and second lenses relative to each other in a radial direction. The first and second lenses may be comprised of a crystalline material.

In some embodiments, the peripheral portion of one of the first or the second lens includes an axially projecting rim and the peripheral portion of the other of the first or the second lens is shaped to receive the rim in a secure abutting relationship. The peripheral portions of both the first lens and the second lens may include a planar portion.

In some embodiments, the peripheral portion of one of the first or the second lens includes a first axially projecting rim and a second axially projecting rim and the peripheral portion of the other of the first or the second lens is shaped to receive the first and second rims in a secure abutting relationship. The peripheral portions of both the first lens and the second lens may include a planar portion.

In some embodiments, the doublet lens assembly includes a hollow cylindrical housing having a central aperture, a first end and a second end, a first lens within the housing, the first lens having a convex surface and a concave surface, the concave surface comprising a peripheral portion and a central portion, and a second lens within the housing, the second lens having a convex surface and a concave surface, the concave surface comprising a peripheral portion and a central portion. The peripheral portion of the first lens abuts the peripheral portion of the second lens and wherein there is an airspace between the central portion of the first lens and the central portion of the second lens. The peripheral portions of the first and second lenses are shaped to fit together in a mating relationship which prevents sliding of the first and second lenses relative to each other in a radial direction.

In some embodiments, the housing includes a ledge projecting into the central aperture, wherein the ledge abuts the convex surface of the second lens to hold the second lens in place within the housing. The assembly may further include a gasket in contact with the convex surface of the first lens and a retaining element in contact with the gasket and connected to the housing to hold the first lens in position within the housing.

In some embodiments, the doublet lens assembly may include a gasket in contact with the convex surface of the first lens and a retaining element in contact with the gasket and connected to the housing. The housing may include a ledge projecting into the central aperture, wherein the ledge abuts the convex surface of the second lens. The first and second lens may be held in position within the housing by the housing ledge and the gasket and retaining element. In some such embodiments, the housing may include threading on an interior surface of the housing and the retaining element may include threading engaged in the threading of the housing.

The peripheral portion of one of the first or the second lens may include an axially projecting rim and the peripheral portion of the other of the first or the second lens may be shaped to receive the rim in a secure abutting relationship. In some embodiments, the peripheral portions of both the first lens and the second lens includes a planar portion.

In some embodiments, the peripheral portion of one of the first or the second lens may include a first axially projecting rim and a second axially projecting rim and the peripheral portion of the other of the first or the second lens may be shaped to receive the first and second rims in a secure abutting relationship. In some such embodiments, the doublet lens of claim 14 wherein the peripheral portions of both the first lens and the second lens includes a planar portion.

In some embodiments, the first and second lens are comprised of a crystalline material.

Other embodiments include methods of assembling a doublet lens assembly. The method may include inserting a first lens into a hollow cylindrical housing, the lens having a ledge projecting into a central aperture of the housing, such that the lens abuts the ledge, and inserting a second lens into the housing onto the first lens such that a peripheral portion of the first lens abuts a peripheral portion of the second lens. A peripheral portion of the first lens may abut a peripheral portion of the second lens with an airspace between a central portion of the first lens and a central portion of the second lens. The peripheral portions of the first and second lenses may be shaped to fit together in a mating relationship which prevents sliding of the first and second lenses relative to each other in a radial direction, such that there is no alignment step other than inserting the second lens onto the first lens.

The method may further include inserting a gasket into the housing on top of the second lens, and securing a retaining element on top of the gasket such that the lenses are held in position between the gasket and the ledge. In other embodiments, the method may further include applying an adhesive to the first and/or second lens to secure the lenses to the housing.

DETAILED DESCRIPTION

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives. In the following description, where applicable, like reference numbers will be used for like components. It should be appreciated that components of the invention may vary among embodiments of the invention while remaining functionally similar. In such cases, like reference numbers may also be used.

Various embodiments provide doublet lenses that can be quickly and precisely aligned. The double lens includes two simple lenses paired together. The doublet lenses may be air spaced doublet lenses which may be used for infrared imaging, such as for night vision goggles, hand held optical instruments that form a single image or video such as thermography instruments used for precisely measuring temperature of components, energy efficiency measurements, night vision scopes, and other devices which require a compact lens having a short focal length and a large sensor.

In various embodiments, the portions of each of the lenses which abut each other are precisely shaped such that one lens precisely and securely mounts on the other lens in a nesting fashion in the desired alignment and within the necessary tolerances. In contrast, in prior art doublet lenses, the abutting portions of the lenses themselves provide no alignment and alignment must therefore be achieved using time consuming and expensive processes.

Figure 1:
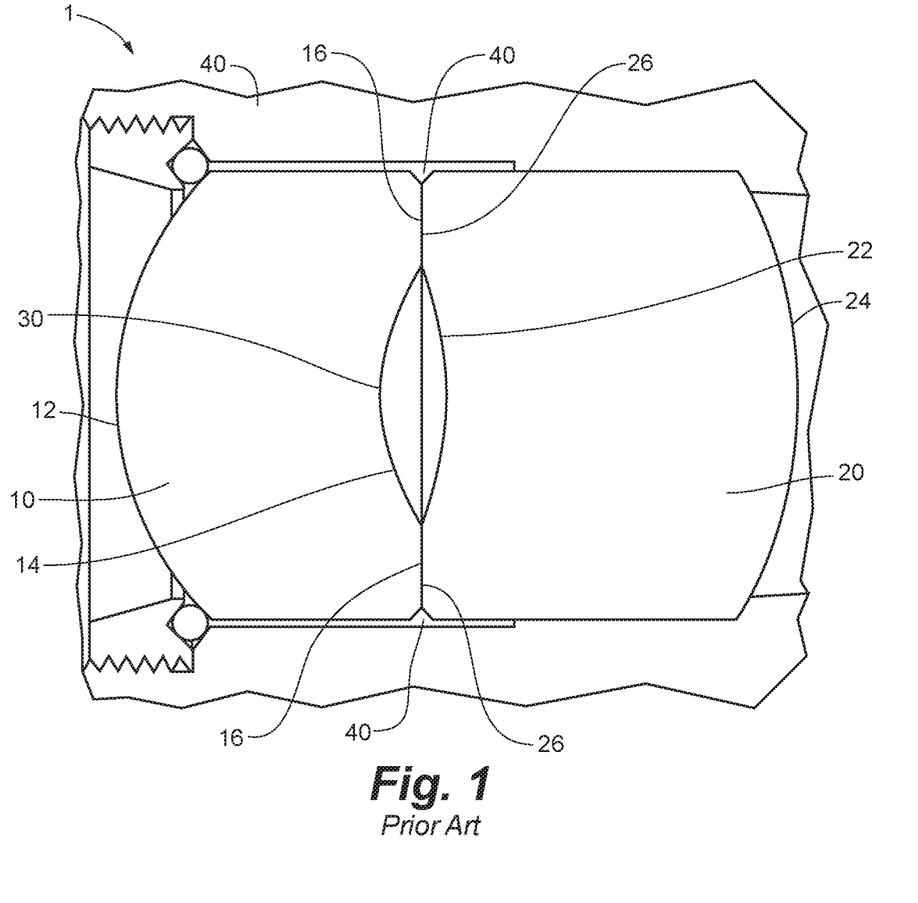
FIG. 1 is a cross sectional view of a prior art doublet lens assembly.
Figure 2:
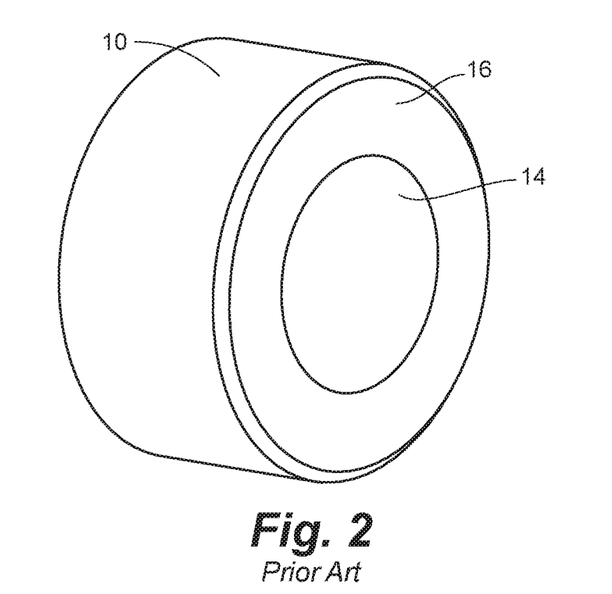
FIG. 2 is a prior art first lens of the doublet lens.
Figure 3:
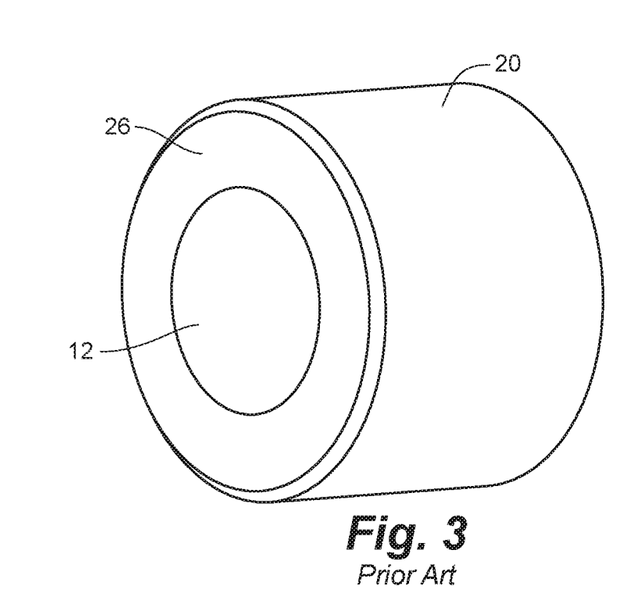
FIG. 3 is a prior art second lens of the doublet lens.

One example of a prior art doublet lens is shown in FIG. 1-3. FIG. 1 is a cross sectional view of the prior art doublet lens assembly 1. FIGS. 2 and 3 are perspective views of the first and second lenses 10, 20 of the prior art doublet lens, respectively. FIG. 1 shows the prior art air-spaced doublet lens assembly 1 including a first lens 10 which is convex and a second lens 20 which is concave. There is an air space 30 between the lenses 10, 20 which are located within a housing 40. The first lens 10 has a first surface 12 and a second surface 14. The second lens 20 likewise has a first surface 22 and a second surface 24. The second surface 14 of the first lens 10 abuts the first surface 22 of the second lens 20 along a peripheral portion 16, 26 around the peripheral circumference of the lens surfaces 14, 22. The peripheral portions 16, 26 of the lenses 10, 20 are planar across the entire abutting surface. As such, the position of the first lens 10 relative to the second lens 20 can be adjusted and they are mobile relative to each other (can slide against each other in a radial direction), even when abutting, until their relative positions are fixed, such as by the placement of adhesive on the exterior surface of the lenses where they abut within groove 40. Precise alignment of the two lenses 10, 20 must therefore be achieved, such as through the use of an autocollimator by using a series of fine adjustments until alignment is achieved, prior to adhering the lenses 10, 20 together.

In contrast, in the various embodiments described herein, the abutting surfaces of the lenses (where the lenses abut each other) are shaped such that the relative positions of the lenses are stabilized and precisely aligned. In this way, the lenses are self-centering relative to each other, with alignment achieved automatically, due to the shapes of the abutting surfaces of the lenses, when the lenses are brought together. Furthermore, once the lenses are brought together, they are shaped to prevent them from sliding against each other in the radial direction and can only be moved relative to each other by separating the lenses.

Figure 4:
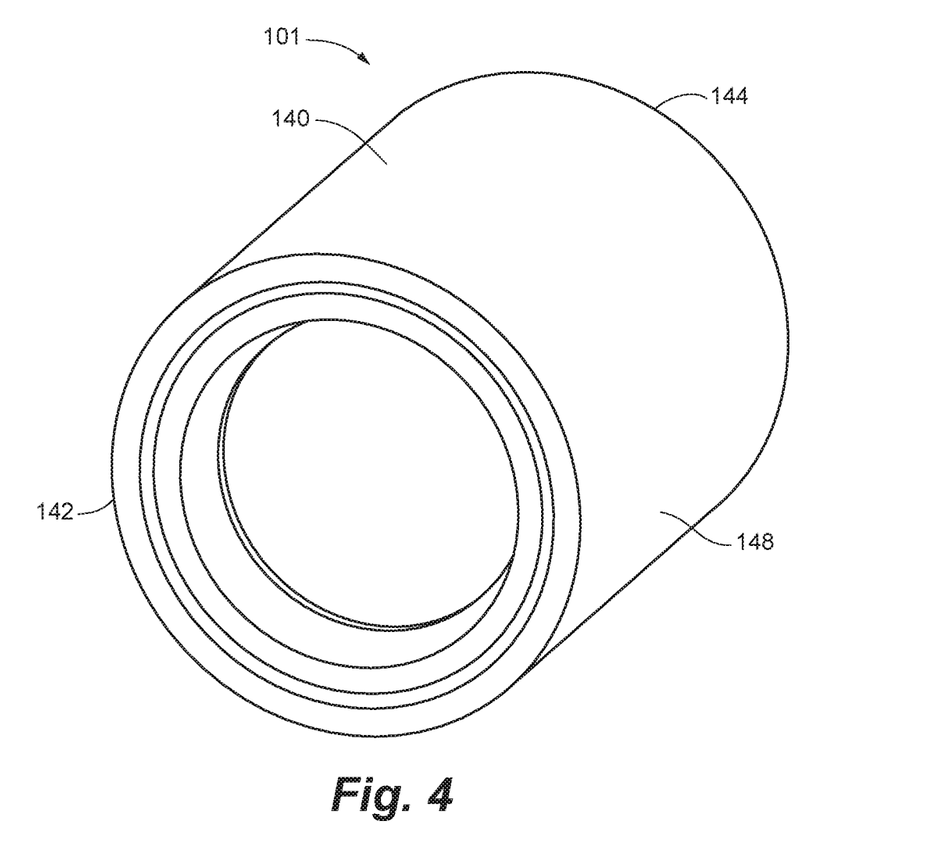
FIG. 4 is a perspective view of a doublet lens assembly according to various embodiments.
Figure 5:
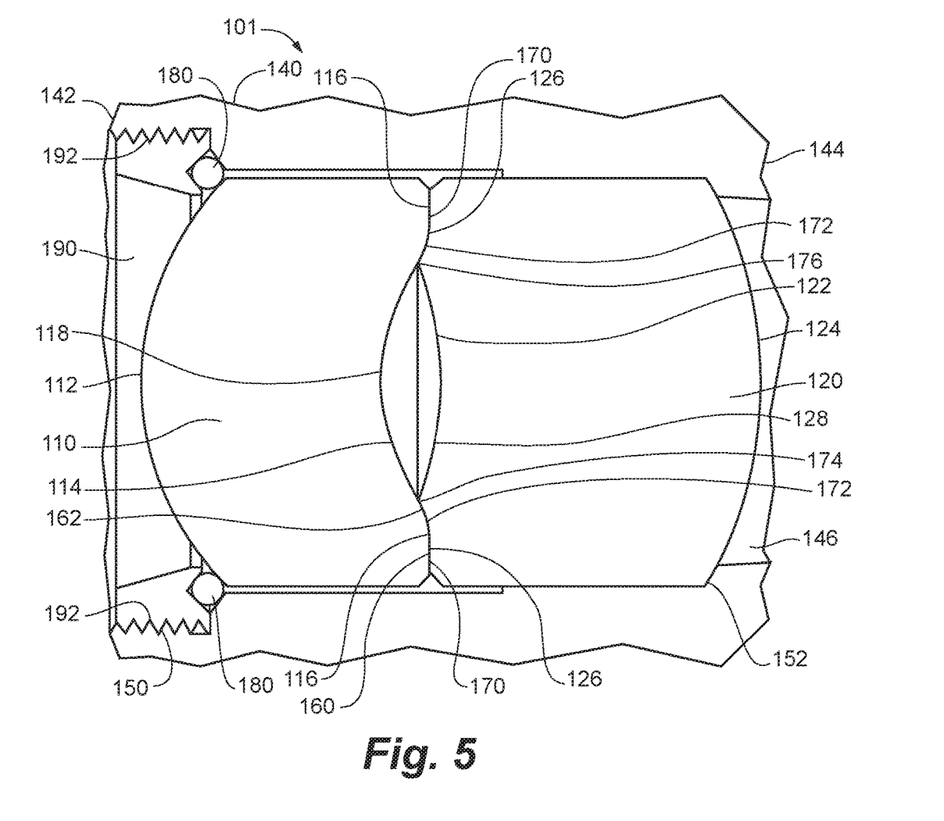
FIG. 5 is a cross sectional view of the doublet lens assembly of FIG. 4.

A perspective view of a doublet lens assembly 101 according to various embodiments is shown in FIG. 4, while a cross-sectional view of the assembly 101 through the central axis of the lenses is shown in FIG. 5. The assembly 101 includes a hollow cylindrical housing 140 having a first end 142, a second end 144, an interior surface 146 surrounding a central aperture and an exterior surface 148. The assembly 101 further includes a first lens 110 and a second lens 120 within the central aperture. The first lens 110 is concave and is located closest to the first end 142 of the housing 140. The second lens 120 is convex and is located closest to the second end 144 of the housing 140. There is an airspace between the lenses between the central apertures of each lens. In use, the first end 142 of the housing 140 is oriented within the device with the first end 142 pointing toward the object being observed or imaged and the second end 144 pointing toward the image sensor. Depending upon the device in which the assembly is used, the sensor may be an uncooled microbolometer infrared focal plane array, for example, but other types of image sensors may alternatively be used as appropriate for the device in which the doublet lens assembly is used.

The housing 140 includes a threaded portion 150 at the first end 142 on the interior surface 146. The housing 140 further includes a narrowed portion near the second end 144 of the housing 140 which forms a ledge 152 within the central aperture, projecting radially inward sufficient to secure the lenses 110, 120 without interfering with their function.

The first lens 110 includes a first surface 112 which is convex and a second surface 114 which is concave. The second lens 120 includes a first surface 122 which is concave and a second surface 124 which is convex. The first lens 110 includes a peripheral portion 116 around the circumference of the periphery of the second surface 114. The second lens 120 similarly includes a peripheral portion 126 around the circumference of the periphery of the first surface 122. As shown in FIG. 5, these peripheral portions 116, 126 of the lenses 110, 120 abut when the lenses 110, 120 are brought together to form a doublet lens. The peripheral portions 116, 126 are shaped to mate together in a secure relationship, as described further below. In this embodiment and the others described herein, these peripheral portions 116, 126 are not a separate component but rather are a part of the lenses 110, 120 themselves, made of the same material as the rest of the lenses 110, 120, but shaped to provide an alignment function.

Figure 6:
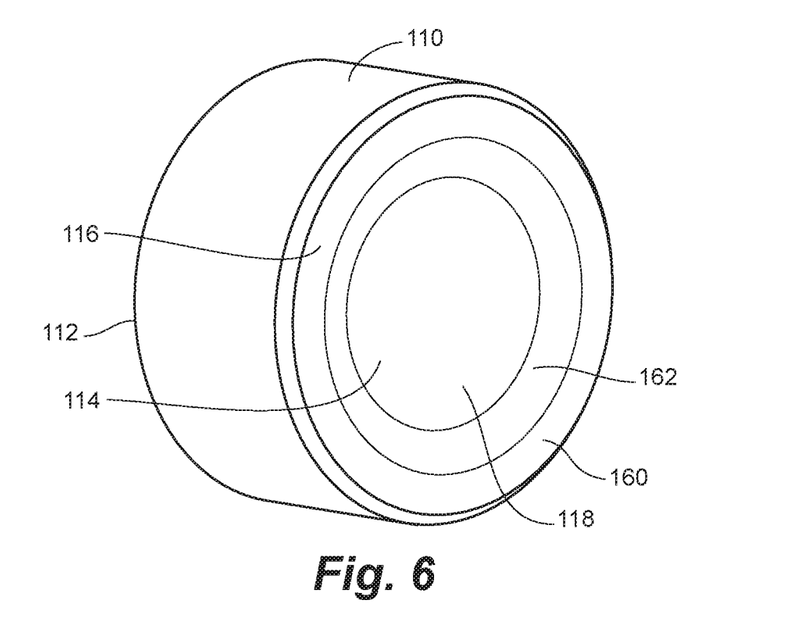
FIG. 6 is a perspective view of the first lens of the doublet lens assembly of FIG. 4.
Figure 7:
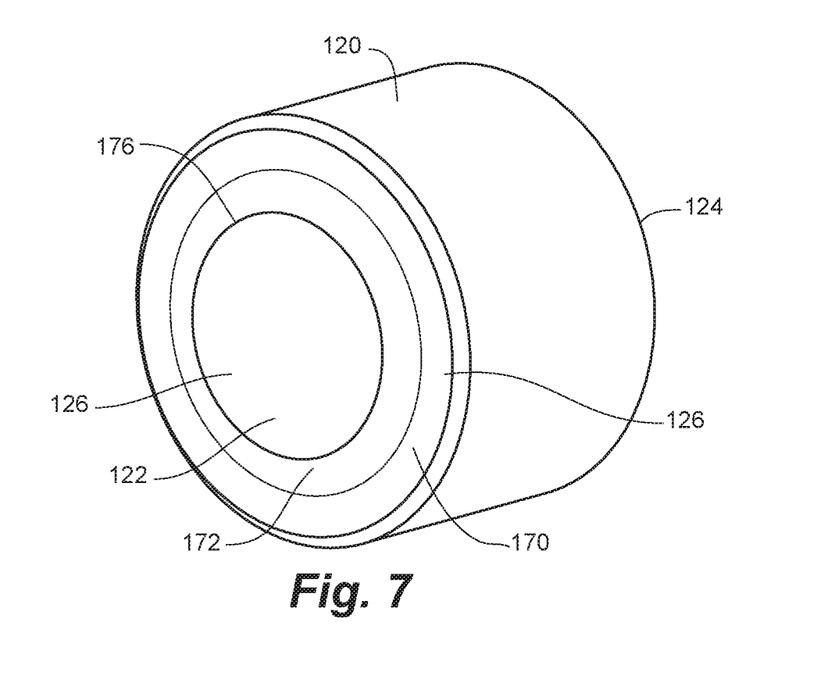
FIG. 7 is a perspective view of the second lens of the doublet lens assembly of FIG. 4.

Perspective views of the first and second lenses 110, 120 are shown in FIGS. 6 and 7, respectively. The shape of the peripheral portions 116, 126 can be seen in these figures, as well as in the cross-sectional view shown in FIG. 5. The peripheral portion 116 of the first lens 110 extends circumferentially around the periphery of the second surface 114 of the lens 110. The peripheral portion 116 includes a planar portion 160 and a curved portion 162. The planar portion 160 is located radially outward relative to the curved portion 162 and forms the majority of the peripheral portion 116. The curved portion 162 is located radially inward relative to the planar portion 160. The curved portion 162 extends smoothly from the planar portion 160 axially inward to merge smoothly with the central portion 118 of the first lens 110.

The peripheral portion 126 of the second lens 120 likewise extends circumferentially around the periphery of the lens 120 but on the first surface 122 of the lens 120. The peripheral portion 126 likewise includes a planar portion 170 forming the majority of the peripheral portion 126 and a curved portion 172. The planar portion 170 is located radially outward relative to the curved portion 172. The curved portion 172 extends smoothly from the planar portion 170 axially inward to form a ridge 174 which extends around the most radially inward aspect of the peripheral portion 116. The abutting surface of the lens 126 located radially outward from the peak 176 of the ridge is a part of the peripheral portion 126. However, the surface of the lens 126 located radially inward from the peak 176 is the central portion 128.

The central portion 118, 128 of each lens 110, 120 is the clear aperture or optical surface of the lens 110, 120. The central portion 118, 128 of each lens 110, 120 does not touch the other lens 110, 120 of the doublet. The central portion 118, 128 is the only portion of the lens used for focusing light or energy from a scene. In contrast, the peripheral portion 116, 126, is the only portion of the lenses 110, 120 used for alignment and provides no optical function.

When the lenses 110, 120 are brought together to form a doublet as shown in FIG. 5, the shapes of peripheral portions 116, 126 of the lenses 110, 120 ensure that they automatically mate in a repeatable and self centering fashion with the desired alignment. That is, the shape of the peripheral portions 116, 126 ensures alignment of the lenses, 110, 120 with no positioning and alignment steps required other than bringing them together, which may be done manually and without any equipment to ensure alignment. The planar portions 160, 170 ensure that there is no error in the tilt of the lenses 110, 120. The ridge portion 174 of the second lens 120 securely engages the curved portion 162 of the first lens 110 to correctly align the axis of the lenses 110, 120 and prevent sliding of the lenses 110, 120 relative to each other out of alignment. The alignment provided by the peripheral portions 116, 126 further ensures that the airspace between the lenses 110, 120 is correct.

It should be appreciated that the shapes of the peripheral portions 116, 126 could be reversed in this embodiment and the other embodiments described herein. For example, the first lens peripheral portion may alternatively include a planar portion and a curved portion extending outward to form a ridge and the second lens peripheral portion may include a planar portion and a curved portion extending smoothly into the central portion. It should further be appreciated that the location of the ridge portion 174 could be modified. For example, the ridge portion 174 could be located at the most radially outward portion of the second lens 120 (or alternatively of the first lens 110) or could be located somewhere in between, anywhere in the peripheral portion, with the peripheral portion of the other lens shaped as appropriate to provide secure alignment of the lenses 110, 120.

The shapes of the peripheral portions 116, 126 described herein allow for precise and efficient assembly. Because the methods described herein rely upon the shape of the peripheral portions 116, 126 of the lenses 110, 120 to ensure correct alignment within tight tolerances, the peripheral portions 116, 126 may be machined using equipment capable of highly precise shaping. An example of equipment which may be used to perform this precise shaping of the peripheral portions 116, 126 is a diamond turning machine, such as the Nanoform machines available from Precitech (Keene, N.H.) or the Ultra Precision Lathes available from Moore Nanotechnology Systems (Swanzey, N.H.). Lenses which are amenable to such precise shaping include crystalline lenses, such as those used in infrared airspace doublet lenses, are useful in various embodiments. Examples of materials which may be used for such crystalline lenses includes germanium, silicon zinc selenide, and infrared chalcogenide glass, for example.

Figure 8:
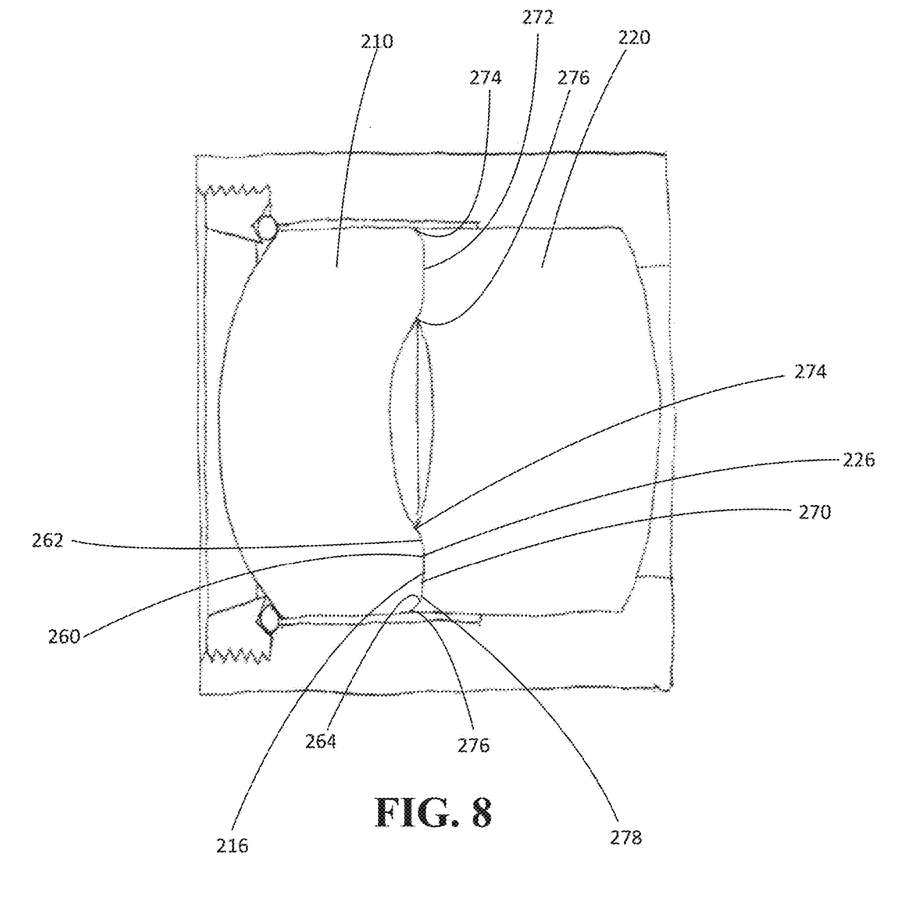
FIG. 8 is a cross sectional view of an alternative doublet lens assembly according to various embodiments.
Figure 9:
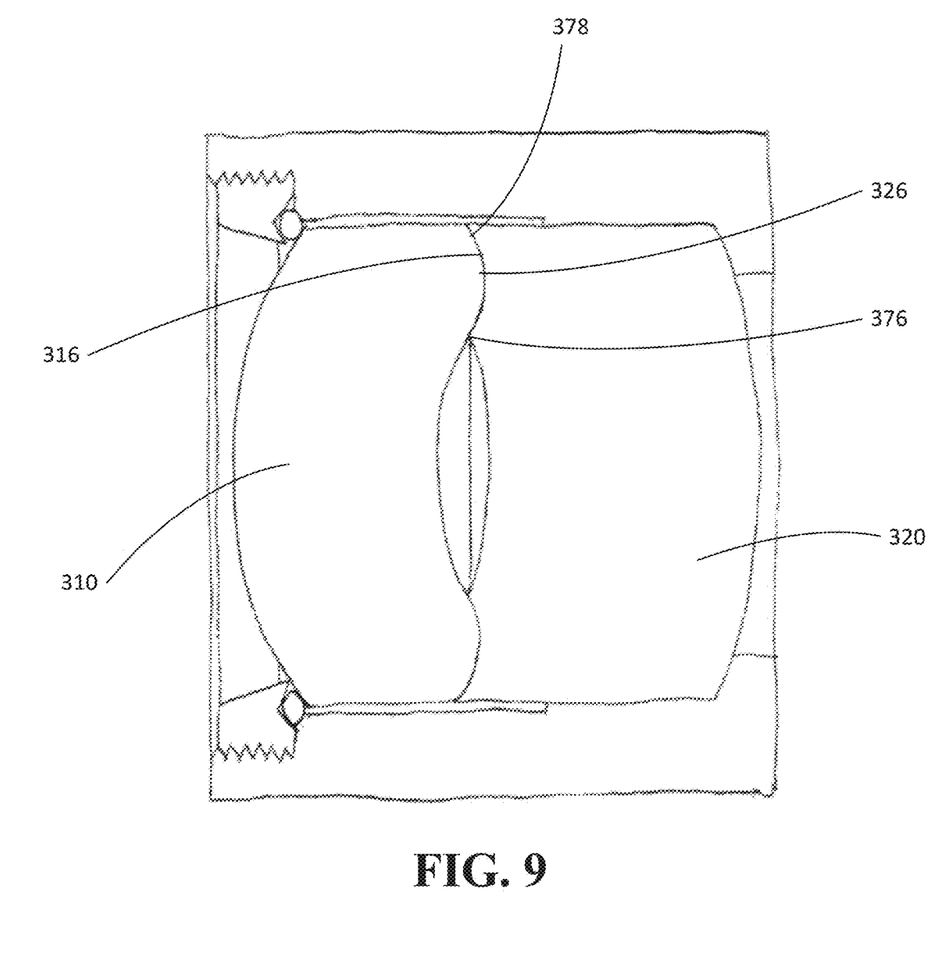
FIG. 9 is a cross sectional view of an another alternative doublet lens assembly according to various embodiments.

Other shapes of the peripheral portions 116, 126 may alternatively be used to position and hold the lenses in precise alignment. For example, the peripheral portion of the second lens 220 may include a planar portion and a central ridge 274 portion as in FIG. 6 and may further include an outer ridge portion 278 in which the peripheral portion 226 curves and extends axially outward around the radially outermost portion of the peripheral portion 226. The peripheral portion 216 of the first lens 216 may include a second curved portion 264 which may be curved around the outer portion, axially backward to match this shape. An example of such a design is shown in the cross sectional image shown in FIG. 8. Alternatively, the peripheral portion 326 of the second lens 320 may be curved throughout, with no planar portion, forming a U-shape with a central and outer ridge 374, 376, while the peripheral portion 316 of the first lens 316 may be likewise curved throughout, in the opposite direction, for a mating engagement. An example of such a design is shown in FIG. 9. Other shapes are also possible, provided that they automatically position and stabilize the lenses in a precisely aligned position relative to each other once the lenses are brought together until the lenses can be secured together.

The first lens and the second lens may be made of the same material or may each be made from different materials than each other. The radius of curvature of the first lens may be the same as, or may be different from, the radius of curvature in the second lens. In the embodiments shown in FIGS. 5-9, the materials are chosen to have different refractive indices and dispersion, which can form a better image than a single lens. The radius of curvature of the first lens 110 is different from that of the second lens 120, as is typical configuration for an airspace doublet.

The design of the peripheral portions and the precise shaping of the peripheral portions of the lens surfaces allows the lenses to be aligned quickly and simply, without the use of any apparatus to check alignment or to reposition the lenses relative to each other into alignment after they are brought together. In some embodiments, the lenses are mounted within a housing to form an assembly as described further below. Although this example refers to the embodiment shown in FIGS. 4-7, the same process may be used in other embodiments as well, such as those shown in FIGS. 8 and 9. The housing 140 may be placed on a surface with the first end 142 oriented upward. The second lens 120 may be placed into the housing 140 central aperture such that the second surface 124 is supported around its periphery by the ledge 152 in the housing interior. The first lens 110 may then be placed atop the second lens 120 within the housing 140, by bringing the peripheral portions 116, 126 into contact such that they automatically nest together in alignment. The lenses 110, 120 are now in alignment, with correct centering, tilt and spacing. A gasket 180 such as an elastomeric gasket such as an O ring may then be placed atop the first lens 110, at the periphery of the first surface 112 of the lens 110. A retaining element 190 may then be placed above the gasket 180, in contact with and providing pressure against the gasket 180 such that the gasket 180 is compressed between the retaining element 190 and the lens 110 to securely hold the lenses 110, 120 in place between the gasket 180 and the ledge 152. The retaining element 190 may be secured in this position by attachment to the housing 140. For example, the retaining element 190 may include threading 192 around its outer perimeter, while the housing 140 may include complementary threading 150 on the inner wall 146 at or near the first end 142, and the retaining element 190 may be threaded into the housing 140 to provide secure tension as shown in FIG. 5. Alternatively, adhesive such as glue may be used to adhere the lenses 110, 120 together and/or to adhere one or both lenses to the inner wall 146 of the housing 140.

Figure 10:
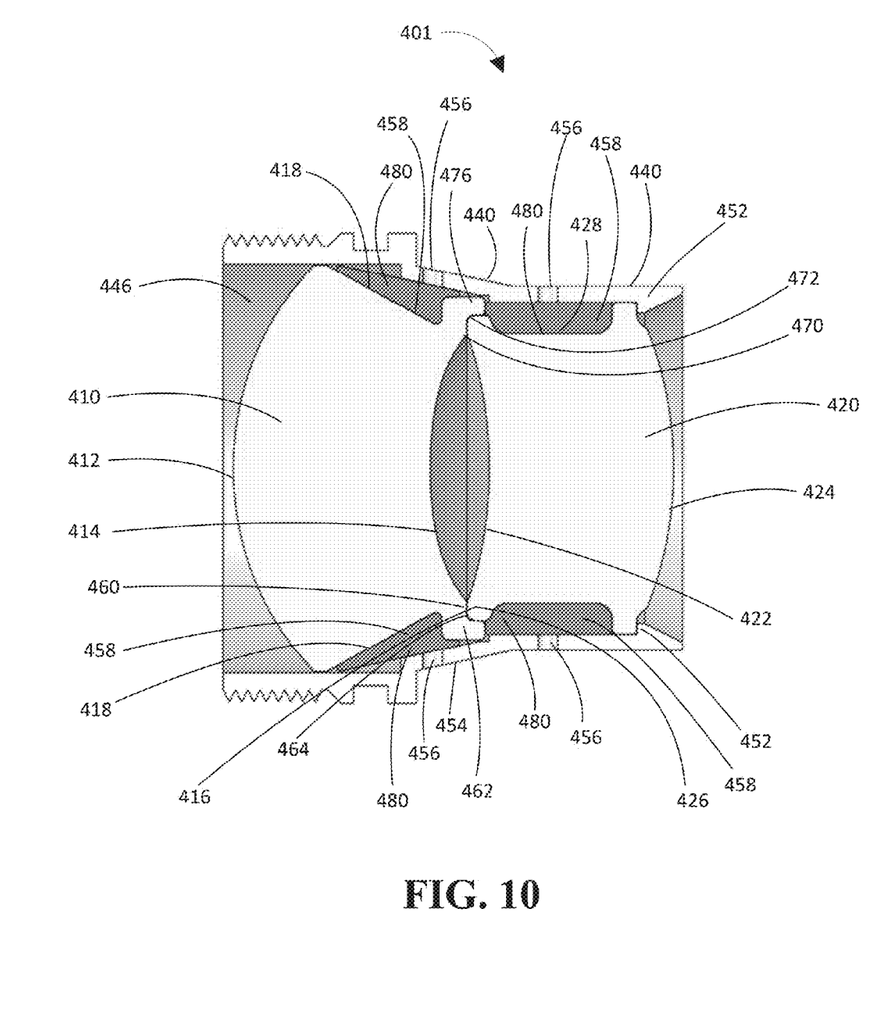
FIG. 10 is a cross sectional view of another alternative doublet lens assembly according to various embodiments.

An alternative embodiment of a lens assembly 401 is shown in the cross-sectional view shown in FIG. 10. This embodiment includes a hollow cylindrical housing 440 having a first end 442 and a second end 444. The housing 440 is wider at the first end 442 than the second end 444, and the housing 440 includes a centrally located flared portion 454. The first lens 410 includes a first surface 412 and a second surface 414, and the second lens 420 likewise includes a first surface 412 and a second surface 414. In this embodiment, the first lens 410 is flared such that the side 418 of the lens 410 generally angles outward from the second surface 414 to the first surface 412 and the first surface 412 is larger than the second surface 414. In contrast, the second lens 420 is not flared and the first and second surfaces 422, 424 are approximately the same size. The second surface 414 of the first lens 410 includes a peripheral portion 416 which abuts the peripheral portion 426 of the first surface 422 of the second lens 420.

In the embodiment shown in FIG. 10, the peripheral portion 416 of the first lens 410 is L-shaped in cross-section and extends radially outward relative to the side 418 of the lens 410. It includes a first portion 460 which is located more radially inward and a second portion 462, perpendicular to the first portion, located radially outward from the first portion 460. The first portion 460 has a planar abutting surface perpendicular to the central axis of the lens 410. The second portion 462 likewise has a planar abutting surface but it extends approximately parallel to the central axis of the lens 410. The transition between the surface of the first and second portions 460, 462 is a rounded portion 464 in this embodiment, but the two portions 460, 462 may alternatively meet at an angle, such as a 90 degree angle, and have no rounded portion.

The peripheral portion 426 of the second lens 420 is located radially outward from the side 428 of the lens 420. It includes a first surface 470 which is planar and perpendicular to the central axis of the lens 420 and a second surface 472 which is also planar but is parallel to the central axis of the lens 420. The transition between the two surfaces 470, 472 is a rounded portion 474 but alternatively the two surfaces 470, 472 could meet at an angle, such as a 90 degree angle, to match the shape of the transition between first and second portions 460, 462 of the peripheral portion 416 of the first lens.

In this embodiment, the peripheral portion 416 of the first lens 410 extends radially outward, beyond the outer edge of the peripheral portion 428 of the second lens 428. When the lenses 410, 420 are abutting to form a doublet lens, the peripheral portion 416 of the first lens 410 extends around the second surface 472 of the peripheral portion 426 of the second lens 420, forming a rim 476 which holds the lenses together in coaxial alignment.

The lens assembly 401 of FIG. 10 can be assembled in a manner similar to the embodiments described above. The housing 440 may be placed on a surface with the first end 442 oriented up. The second lens 420 may be inserted into the central aperture of the housing 440 with the periphery of the second surface 424 resting on the ledge 452 of the housing 440 and held in position by gravity. The first lens 410 may then be placed upon the second lens 420, with the peripheral portions 416, 426 abutting and the lenses 410, 420 automatically aligning. In this embodiment, the housing 440 has no internal threading for placement of a retaining element. Rather, the housing has a plurality of channels 456 extending through the wall of the housing 440 at the locations of the first and second lenses 410, 420. Adhesive 480 may be inserted through the channels 456 into the space 458 between the edges 418, 428 of the lenses 410, 420 and the inner wall 446 of the housing 440 to adhere each lens 410, 420 to the inner wall 446 of the housing 440. Alternatively, the inner wall 446 of the housing 440 may be threaded for use with a retaining element and a gasket as described above. A system of channels and adhesive as described here may likewise be used in the other embodiments for securing the lenses.

The doublet lens assemblies may be used as components of various types of equipment. When the doublet lens is the only lens, precise alignment of the lenses of the doublet to each other is required, but less precision is needed within the housing as the doublet lens can be aligned with the sensor with less precision than is needed for alignment of lenses to each other. As such, high precision manufacturing may not be needed for the housing, provided that the peripheral portions of the lenses are created with high precision.

Once assembled, the lens assembly may be assembled into equipment such as night vision goggles or other equipment by affixing the housing to the appropriate component of the equipment, such as the housing. Although not shown in the figures, the exterior of the housing may include elements to aid in affixing the housing to the other components.

Various examples have been described. These and other examples, including combinations of such examples, are within the scope of the following claims.

The invention claimed is:

1. A doublet lens extending along a central lens axis, the doublet lens comprising:
    a first lens having a convex surface and an opposite surface, the opposite surface being opposite the convex surface, the opposite surface comprising a concave central portion and a peripheral portion extending radially outward from the central portion, the peripheral portion having a curved portion that extends radially inward to merge smoothly with the central portion;
    a second lens having a convex surface and an opposite surface, the opposite surface being opposite the convex surface, the opposite surface comprising a concave central portion and a peripheral portion extending radially outward from the central portion, the peripheral portion having a curved portion that extends smoothly radially inward, the curved portion forming a ridge that intersects with the central portion of the second lens to form a peak;
    wherein the curved portion of the peripheral portion of the first lens abuts the curved portion and the ridge of the peripheral portion of the second lens and wherein there is an airspace between the central portion of the first lens and the central portion of the second lens;
    wherein the peripheral portions of the first and second lenses are shaped to fit together such that the curved portion of the first lens abuts the curved portion of the second lens in a mating relationship that is shaped to prevent sliding of the first and second lenses relative to each other in a radial direction.

2. The doublet lens of claim 1 wherein the peripheral portions of both the first lens and the second lens includes a planar portion.

3. The doublet lens of claim 1 wherein the first and second lens are comprised of a crystalline material.

4. A doublet lens assembly extending along a central lens axis, the doublet lens assembly comprising:
    a hollow cylindrical housing having a central aperture, a first end and a second end;
    a first lens within the housing, the first lens having a convex surface and an opposite surface being opposite the convex surface, the opposite surface comprising a concave central portion and a peripheral portion extending radial outward from the central portion, the peripheral portion having a curved portion that extends radially inward to merge smoothly with the central portion;
    a second lens within the housing, the second lens having a convex surface and an opposite surface, the opposite surface comprising a concave central portion and a peripheral portion extending radially outward from the central portion, the peripheral portion having a curved portion that extends smoothly radially inward, the curved portion forming a ridge that intersects with the central portion of the second lens to form a peak;
    wherein the curved portion of the peripheral portion of the first lens abuts the curved portion and the ridge of the peripheral portion of the second lens and wherein there is an airspace between the central portion of the first lens and the central portion of the second lens;
    wherein the peripheral portions of the first and second lenses are shaped to fit together such that the curved portion of the first lens abuts the curved portion of the second lens in a mating relationship that is shaped to prevent sliding of the first and second lenses relative to each other in a radial direction.

5. The doublet lens assembly of claim 4 wherein the housing comprising a ledge projecting into the central aperture, wherein the ledge abuts the convex surface of the second lens to hold the second lens in place within the housing.

6. The doublet lens assembly of claim 4 further comprising a gasket in contact with the convex surface of the first lens and a retaining element in contact with the gasket and connected to the housing.

7. The doublet lens assembly of claim 4 further comprising a gasket in contact with the convex surface of the first lens and a retaining element in contact with the gasket and connected to the housing;
    wherein the housing comprising a ledge projecting into the central aperture, wherein the ledge abuts the convex surface of the second lens;
    wherein the first and second lens are held in position within the housing by the housing ledge and the gasket and retaining element.

8. The doublet lens assembly of claim 7 wherein the housing comprises threading on an interior surface of the housing, and wherein the retaining element comprises threading engaged in the threading of the housing.

9. The doublet lens of claim 4 wherein the peripheral portions of both the first lens and the second lens includes a planar portion.

10. The doublet lens of claim 4 wherein the first and second lens are comprised of a crystalline material.

11. A method of assembling a doublet lens assembly that extends along a central lens axis comprising:
    inserting a first lens into a hollow cylindrical housing, the first lens having a convex surface and an opposite surface, the opposite surface being opposite the convex surface, the opposite surface comprising a concave central portion and a peripheral portion extending radially outward from the central portion, the peripheral portion having a curved portion that extends radially inward to merge smoothly with the central portion, the housing having a ledge projecting into a central aperture of the housing, such that the first lens abuts the ledge;
    inserting a second lens into the housing and onto the first lens such that a peripheral portion of the first lens abuts a peripheral portion of the second lens, the second lens having a convex surface and an opposite surface, the opposite surface being opposite the convex surface, the opposite surface comprising a concave central portion and a peripheral portion extending radially outward from the central portion, the peripheral portion having a curved portion that extends smoothly radially inward, the curved portion forming a ridge that intersects with the central portion of the second lens to form a peak;
    wherein the curved portion of the peripheral portion of the first lens abuts the curved portion and the ridge of the peripheral portion of the second lens and wherein there is an airspace between a central portion of the first lens and a central portion of the second lens;
    wherein the peripheral portions of the first and second lenses are shaped to fit together such that the curved portion of the first lens abuts the curved portion of the second lens in a mating relationship that is shaped to prevent sliding of the first and second lenses relative to each other in a radial direction, and there is no alignment step other than inserting the second lens onto the first lens.

12. The method of claim 11 further comprising:

inserting a gasket into the housing on top of the second lens;

securing a retaining element on top of the gasket such that the lenses are held in position between the gasket and the ledge.

13. The method of claim 11 further comprising:

applying an adhesive to the first and second lens to secure the lenses to the housing.

* * * * *